2,817,658
METALLISABLE TRISAZO DYESTUFFS

Werner Bossard, Riehen, near Basel, and Jürg Ammann, Basel, Switzerland, assignors to J. R. Geigy A.-G., Basel, Switzerland, a Swiss firm No Drawing. Application November 21, 1955
Serial No. 548,262

Claims priority, application Switzerland December 3, 1954

6 Claims. (Cl. 260—157)

The present invention concerns metallisable trisazo dyestuffs which are distinguished by good affinity to cellulose fibres and by the very good wet and light fastness properties of the coppered cellulose dyeings. It concerns also processes for the production of these new trisazo dyestuffs, processes for the fast dyeing of cellulose fibres using the new trisazo dyestuffs and also, as industrial product, the cellulose material fast dyed with the help of these dyestuffs.

It has now been found that very valuable metallisable dyestuffs having affinity to cellulose fibres are obtained if 1 mol of a tetrazotised 4.4'-diamino-3.3'-dialkoxydiphenyl is coupled first with 1 mol of an o-hydroxybenzene carboxylic acid and then with 1 mol of a monoazo dyestuff of the general Formula I

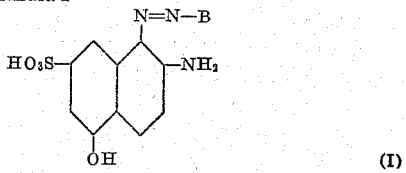

in which B represents a 2.3-azolo-1-phenyl radical.

Chiefly 4.4'-diamino-3.3'-dimethoxydiphenyl but also if desired 4.4'-diamino-3.3'-diethoxy- or -3.3'-dicarboxymethoxy-diphenyl can be used as tetrazo components in the process according to the present application.

o-Hydroxybenzene carboxylic acids, advantageously 2-hydroxybenzene-1-carboxylic acid, are used as the first coupling component. However, their reactive homologues and derivatives substituted in the ring can also be used, for example the 3- or 4-methyl-2-hydroxy-benzene-1-carboxylic acid, 3.6-dimethyl-2-hydroxybenzene-1-carboxylic acid, 3-chloro-2-hydroxybenzene-1-carboxylic acid, 4-methoxy- or 4-amino- or 4-acetamino-2-hydroxy-benzene-1-carboxylic acid.

The monoazo dyestuffs corresponding to the above Formula I which can be coupled and which are used as azo components in the second step are obtained by acid coupling of 2-primary amino-5-hydroxynaphthalene-7-sulphonic acid with a diazotised 2.3-azolo-1-aminobenzene compound which contains the amino group in the neighbouring position to a nitrogen atom of the hetero-ring and preferably in the neighbouring position to an imino group or to a tertiary ring N-atom which by tautomeric re-arrangement can form an imino group. Such monoazo dyestuffs of the above formula are obtained, for example from diazotised 7-amino-indoles, 7-amino-indazoles, 7-amino-benzimidazoles, 7-amino-benztriazoles, which may possibly be further substituted by the usual atoms and groups in aromatic substances, e. g. by halogen, alkyl, aralkyl, phenyl, carboxyl, nitro, acylamino, sulphonic acid amide, alkyl sulphone groups, by acid coupling with 2 - primary amino - 5 - hydroxynaphthalene-7-sulphonic acid.

The coupling of the monoazo diazo compounds obtained under the usual conditions in the first step with the monoazo dyestuff of the general Formula I, is performed in an alkaline medium, for example in the presence of sodium carbonate or of ammonia and if necessary of tertiary organic nitrogen bases such as pyridine and triethanolamine which accelerate the coupling.

In the form of their water soluble alkali or ammonium salts, the new trisazo dyestuffs are dark powders which dissolve in water according to the composition with a more or less dull violet colour and in concentrated sulphuric acid with a blue-black colour. They dye cellulose fibres from a liquor containing Glaubers' salts in violet-black shades. Black dyeings which are fast to wet and light are obtained by treating the dyeings with agents giving off copper. The coppering can be performed in the dyebath or in a fresh bath. The usual inorganic or organic copper salts such as copper sulphate, copper chloride, copper acetate and, possibly also complex copper salts such as result from ammonia, organic amines or from certain aliphatic hydroxy fatty acids in an alkaline medium, can be used for this purpose. Sometimes, suitable trisazo dyestuffs according to the present invention can also be treated in substance with agents giving off metal.

The following examples illustrate the invention without limiting it in any way. Where not otherwise stated, parts are given as parts by weight and the temperatures are in degrees centigrade. The relationship of parts by weight to parts by volume is as that of kilogrammes to litres.

Example 1

24.4 parts of tetrazotised 4.4'-diamino-3.3'-dimethoxydiphenyl are coupled in the presence of 30 parts of sodium carbonate with 17 parts of 2-hydroxy-4-methylbenzene-1-carboxylic acid to form the intermediate product.

At the same time 14.8 parts of 1-methyl-4-aminobenztriazole are dissolved in excess hydrochloric acid and an aqueous solution of 6.9 parts of sodium nitrite are added while stirring well at 0–2°. After a few minutes, a weak acid to litmus paper solution of 23.9 parts of 2-amino-5-hydroxynaphthalene-7-sulphonic acid and 5.3 parts of sodium carbonate in 200 parts of water are added while cooling with ice to this diazo solution. On completion of the coupling, the red monoazo dyestuff in a weakly alkaline solution is coupled at 0–5° with the diazo monoazo compound described above. The trisazo dyestuff formed is precipitated with sodium chloride, filtered off and dried. The dark powder of the formula:

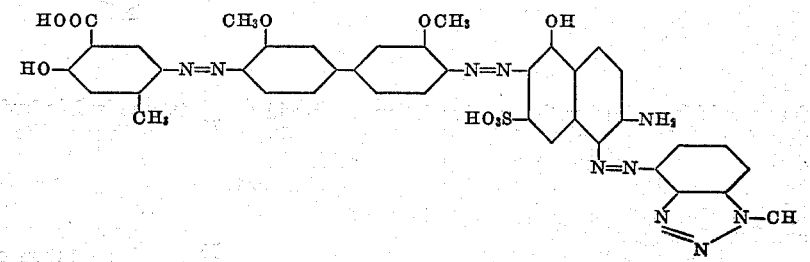

dissolves in water with a black-violet colour and in concentrated sulphuric acid with a blue-black colour. Cellulose dyeings after being coppered are black and they have very good wet and light fastness properties.

If in this example 19.2 parts of 4-aminobenztriazolyl-1-acetic acid, 15.1 parts of 4-aminopiazothiole or 15 parts of 4-aminobenzthiazole, 22.4 parts of 4-amino-6-methoxybenzthiazole-2-carboxylic acid or 14.8 parts of 2-methyl-4-aminobenzoxazolone are used instead of 14.8 parts of 1-methyl-4-aminobenztriazole, and otherwise the same procedure is followed, then dyestuffs with similar shades and properties are obtained.

Example 2

24.4 parts of 4.4'-diamino-3.3'-dimethoxydiphenyl are tetrazotised in the usual way and coupled with 15.3 parts of 2-hydroxybenzene-1-carboxylic acid and 30 parts of sodium carbonate to form the diazo monoazo dyestuff. At the same time 13.4 parts of 7-aminobenztriazole are dissolved in excess hydrochloric acid and 6.9 parts of sodium nitrite dissolved in a little water are quickly added while stirring very quickly at 0–2°. A weakly acid to litmus paper solution of 23.9 parts of 2-amino-5-hydroxynaphthalene-7-sulphonic acid and 5.3 parts of sodium carbonate in 200 parts of water is gradually added. The coupling proceeds without difficulty; it can be accelerated by the careful dropwise addition of an aqueous sodium acetate solution until the reaction is weakly mineral acid. The monoazo dyestuff which, in an alkaline to litmus paper medium, has been precipitated with sodium chloride and isolated by filtration, is dissolved in 600 parts of water and 150 parts by volume of pyridine and is then coupled in the presence of excess sodium carbonate at 0–5° with the brown-red suspension of the above monoazo diazo compound. The trisazo dyestuff of the formula:

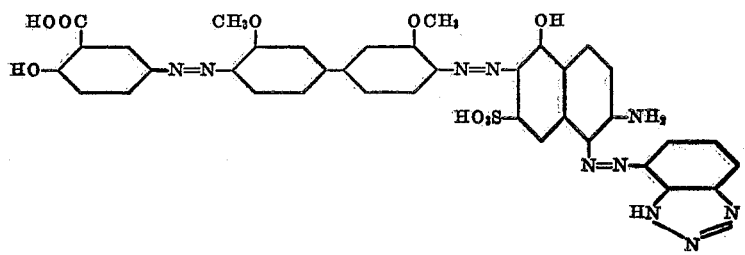

forms quickly and, after the usual isolation and purification, is a dark powder which dissolves in water with a dark violet and in concentrated sulphuric acid with a blue-black colour. The full black cellulose dyeings obtained after treatment with copper, have excellent wet and light fastness properties.

If, instead of 7-aminobenztriazole, 14.8 parts of 5-methyl-7-aminobenztriazole are used, then a dyestuff with similar good properties is obtained.

Example 3

The monoazo diazo compound according to Example 2 from 24.4 parts of tetrazotised 4.4'-diamino-3.3'-dimethoxydiphenyl and 15.3 parts of 2-hydroxybenzene-1-carboxylic acid is poured under ice cooling into the aqueous solution of the red monoazo dyestuff obtained by coupling in an acid medium 17.8 parts of diazotised 7-aminobenztriazole-5-carboxylic acid with 23.9 parts of 2-amino-5-hydroxynaphthalene-7-sulphonic acid, the solution also containing 20 parts of sodium carbonate. As soon as the coupling to form the trisazo dyestuff is complete, this is precipitated with sodium chloride, filtered off and dried. The dyestuff is a dark powder. It corresponds to the formula:

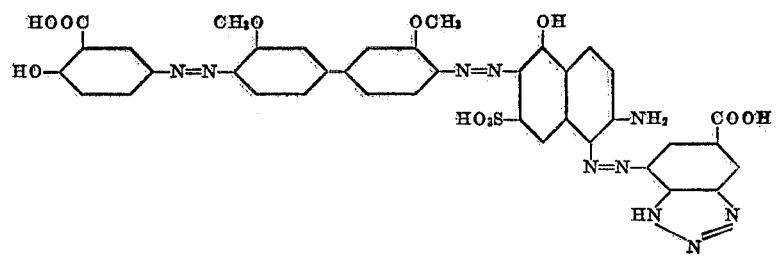

and dissolves in water with a dark violet and in concentrated sulphuric acid with a blue-black colour. The after-coppered dyeings of cellulose fibres are deep black and have excellent wet and light fastness properties.

If in this example the 2-hydroxybenzene-1-carboxylic acid is replaced by 17 parts of 2-hydroxy-3- or -4-methylbenzene-1-carboxylic acid, 19.2 parts of 2-hydroxy-3-chlorobenzene-1-carboxylic acid, 21.5 parts of 2-hydroxy-4-acetylaminobenzene-1-carboxylic acid, 18.6 parts of 2-hydroxy-4-methoxybenzene-1-carboxylic acid or 18.4 parts of 2-hydroxy-3.6-dimethylbenzene-1-carboxylic acid and the 7-aminobenztriazole-5-carboxylic acid is replaced by 21.4 parts of 7-aminobenztriazole-5-sulphonic acid or by 21.2 parts of 7-aminobenztriazole-5-methyl sulphone and otherwise the same procedure is followed, then dyestuffs with similar properties are obtained.

Example 4

24.4 parts of 4.4'-diamino-3.3'-dimethoxydiphenyl are tetrazotised in hydrochloric acid solution with 13.8 parts of sodium nitrite and the tetrazo compound obtained is coupled in the presence of 30 parts of sodium carbonate with 17 parts of 2-hydroxy-3-methylbenzene-1-carboxylic acid. The red-brown suspension of the diazo monoazo compound is poured at 0–5° into the sodium carbonate alkaline solution of the red monoazo dyestuff obtained by mineral acid coupling of 13.3 parts of diazotised 7-amino-indazole with 23.9 parts of 2-amino-5-hydroxy-naphthalene-7-sulphonic acid. As soon as the coupling to form the trisazo dyestuff of the formula:

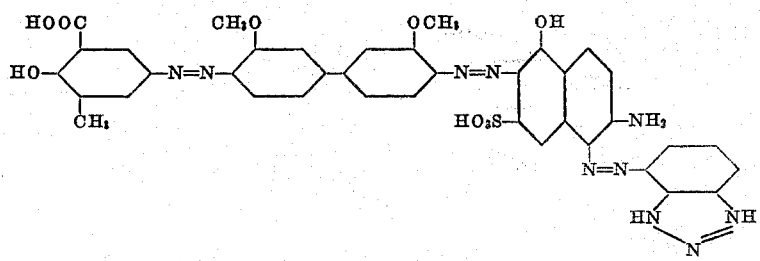

is complete, the dyestuff is precipitated by the addition of a little sodium chloride, filtered off, washed and dried. It is a dark powder which dissolves in water with a dull violet and in concentrated sulphuric acid with a blue-black colour. The cellulose dyeings which, on being after coppered are black, have excellent wet and light fastness properties.

If in this example, 14.7 parts of 5-methyl-7-amino-indazole, 14.7 parts of 6-methyl-7-amino-indazole, 21.3 parts of 7-amino-indazole-4-sulphonic acid, 13.2 parts of 7-amino-indole, 17.6 parts of 7-amino-indole-2-carboxylic acid, 19 parts of 3-methyl-7-amino-indole-2-carboxylic acid or 17.3 parts of 2-ethyl-3-methyl-7-amino-indole are used instead of 13.3 parts of 7-amino-indazole, and otherwise the same procedure is followed, then dyestuffs with similar properties are obtained.

*Example 5*

The diazo monoazo compound produced according to Example 2 from 24.4 parts of tetrazotised 4.4'-diamino-3.3'-dimethoxydiphenyl and 15.3 parts of 2-hydroxybenzene-1-carboxylic acid is poured at 0–5° into a solution, containing sodium carbonate, of the monoazo dyestuff obtained by acid coupling of 13.3 parts of diazotised 7-aminobenzimidazole with 23.9 parts of 2-amino-5-hydroxynaphthalene-7-sulphonic acid in 600 parts of water and 150 parts by volume of pyridine. After the coupling, which occurs quickly, the trisazo dyestuff of the formula:

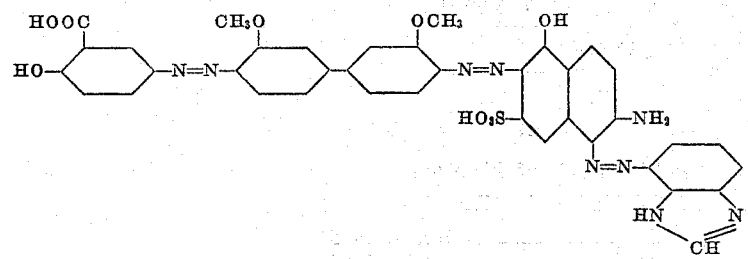

is precipitated with sodium chloride, filtered off and dried. The dark powder dissolves in water with black-violet and in concentrated sulphuric acid with a blue-black colour. On after treating the dark violet direct dyeings with copper salts, they become black and have very good wet and light fastness properties.

Further dyestuffs with similar properties are obtained if, instead of 13.3 parts of 7-aminobenzimidazole, 14.7 parts of 2-methyl-7-aminobenzimidazole or 16.1 parts of 2.5-dimethyl-7-aminobenzimidazole or 19.1 parts of 2-methyl-7-aminobenzimidazole-5-carboxylic acid or 22.7 parts of 2-methyl-7-aminobenzimidazole-5-sulphonic acid or 28.9 parts of 2-phenyl-7-aminobenzimidazole-5-sulphonic acid are used.

*Example 6*

2 parts of the dyestuff obtained according to Example 2 are dissolved in a dyebath containing 3000 parts of water and 2 parts of sodium carbonate. 100 parts of cotton are entered at 40–50°, the bath is heated within 30 minutes to 90–95°, 30 parts of sodium sulphate are added and dyeing is performed for 45 minutes at this temperature. After this time, the dyed goods are rinsed cold and after treated in a fresh bath with 2 parts of crystallised copper sulphate in 2000 parts of water and 2 parts of 30% acetic acid for 30 minutes at 70°. The goods are rinsed and dried in the usual way. The black cotton dyeing has excellent fastness properties.

What we claim is:

1. A trisazo dyestuff having the general formula:

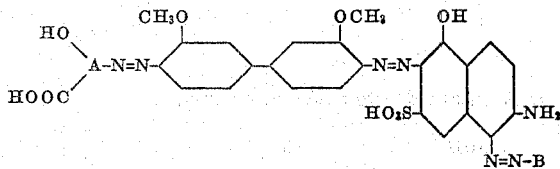

wherein:

A represents an aromatic radical of the benzene series containing the hydroxy and carboxyl group in the o-position to each other, and B represents a 2.3-azolo-1-phenyl radical containing an imino group in neighbouring position to the azo linkage.

2. A trisazo dyestuff of the formula:

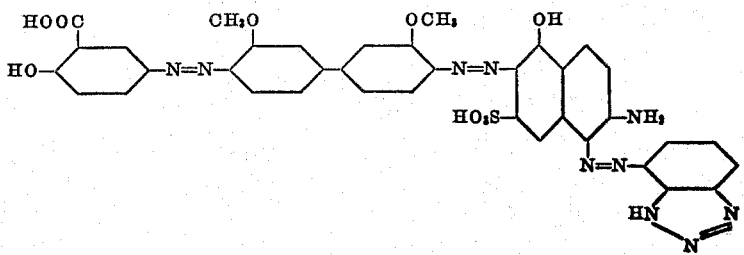

3. A trisazo dyestuff of the formula:
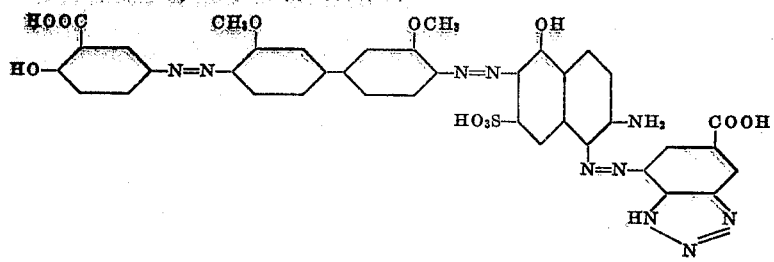
4. A trisazo dyestuff of the formula:
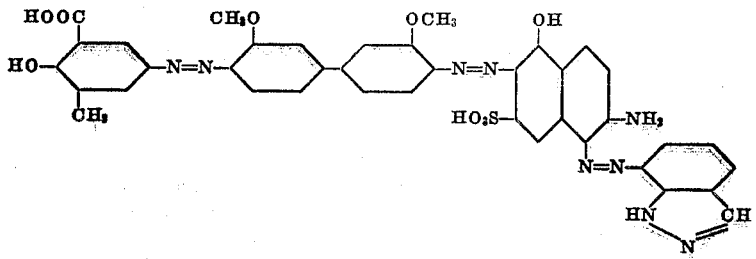
5. A trisazo dyestuff of the formula:
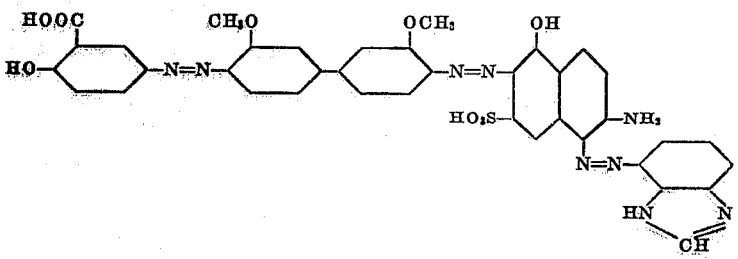
6. A trisazo dyestuff of the formula:
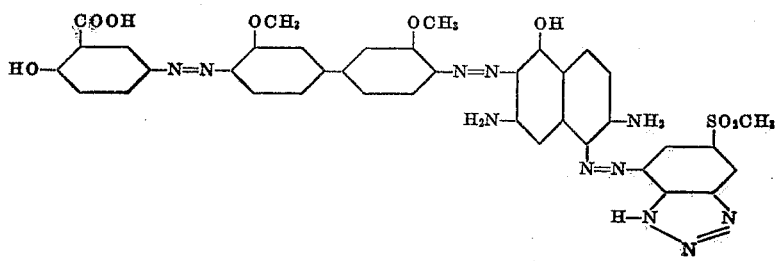
References Cited in the file of this patent
UNITED STATES PATENTS
| 2,390,480 | West | Dec. 4, 1945 |
| 2,507,754 | Bossard et al. | May 16, 1950 |
FOREIGN PATENTS
| 191,738 | Switzerland | Sept. 16, 1937 |
| 220,116 | Switzerland | June 16, 1942 |